US011652941B1

(12) United States Patent
Gopalakrishnan et al.

(10) Patent No.: US 11,652,941 B1
(45) Date of Patent: May 16, 2023

(54) METHODS AND SYSTEMS FOR SECURING CONFIDENTIAL CONTENT OF A DOCUMENT WHILE PRINTING AND/OR GENERATING A COPY OF THE DOCUMENT

(71) Applicant: XEROX CORPORATION, Norwalk, CT (US)

(72) Inventors: Sainarayanan Gopalakrishnan, Chennai (IN); Rajasekar Kanagasabai, Chennai (IN); Haripriya Chandran, Kulathur Chal (IN); Anand Arokia Raj Antony Muthu Rayar, Chennai District (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/717,395

(22) Filed: Apr. 11, 2022

(51) Int. Cl.
 *H04N 1/00* (2006.01)
 *H04N 1/32* (2006.01)

(52) U.S. Cl.
 CPC ..... *H04N 1/00864* (2013.01); *H04N 1/32192* (2013.01); *H04N 1/32229* (2013.01)

(58) Field of Classification Search
 CPC .......... H04N 1/00864; H04N 1/32192; H04N 1/32229
 See application file for complete search history.

(56) References Cited

U.S. PATENT DOCUMENTS

| | | | | |
|---|---|---|---|---|
| 5,631,723 A | * | 5/1997 | Arimoto | H04N 1/32144 399/366 |
| 7,234,645 B2 | * | 6/2007 | Silverbrook | B41J 2/16 235/494 |
| 2003/0169456 A1 | * | 9/2003 | Suzaki | G06T 1/0028 382/190 |
| 2006/0133670 A1 | * | 6/2006 | Barrus | G06F 40/174 715/255 |
| 2007/0183000 A1 | * | 8/2007 | Eisen | H04N 1/32229 358/452 |
| 2008/0013727 A1 | * | 1/2008 | Uemura | H04N 1/448 380/243 |
| 2008/0104707 A1 | * | 5/2008 | Saka | H04N 1/00437 726/26 |
| 2008/0104715 A1 | * | 5/2008 | Saka | H04N 1/32144 726/31 |
| 2008/0320604 A1 | * | 12/2008 | Nakajima | G06F 21/608 726/28 |

(Continued)

*Primary Examiner* — Ted W Barnes

(57) ABSTRACT

The disclosure discloses methods and systems for securing confidential content of a document. The method includes receiving a print request to print the document. A user interface is provided to the user having a secure option, the secure option further includes a partial secure option to secure partial content of the document. Based on the selection of the partial secure option, a selection of a confidential area including the confidential content in the document is received. Based on the selection, one or more coordinates of the confidential area are calculated. Then, an infrared (IR) mark is embedded in the document. While embedding the IR mark, the one or more coordinates of the confidential area including the confidential content in the document is embedded. Finally, a printed document is output with the IR mark including the coordinates of the confidential area for later identification of the confidential content and/or use such as masking.

30 Claims, 15 Drawing Sheets

(56) References Cited

U.S. PATENT DOCUMENTS

| | | | |
|---|---|---|---|
| 2009/0231632 A1* | 9/2009 | Kikuchi | H04N 1/00864 |
| | | | 358/448 |
| 2018/0129815 A1* | 5/2018 | Mashimo | G06F 3/1222 |
| 2018/0255198 A1* | 9/2018 | Takano | H04N 1/00018 |
| 2021/0377420 A1* | 12/2021 | Park | H04N 1/32133 |

* cited by examiner

METHODS AND SYSTEMS FOR SECURING CONFIDENTIAL CONTENT OF A DOCUMENT WHILE PRINTING AND/OR GENERATING A COPY OF THE DOCUMENT

TECHNICAL HELD

The present disclosure relates to security of documents, and more particularly, to methods and systems for securing confidential content of a document while printing and/or while generating one or more copies of the document.

BACKGROUND

Every person maintains certain documents such as passport, PAN, Social Security Numbers (SSNs), certificates, degrees, for records and/or for different purposes. For example, a user requires to share his confidential documents with other users such as a passport agent, a bank agent, or the like. Some documents may be confidential while others may be non-confidential and thus, can be directly shared with any other user. These days, most common and popular approach of securing confidential documents is through special marks such as infrared (IR) security marks. To read such special marks, special IR readers or a source of light is needed. This whole arrangement is very costly and requires a dedicated person.

While generating copies of the confidential document, multi-function devices have an option to stop or block copying the confidential document in order to secure the confidential document. For example, each time when any user, say, a bank agent tries to create a copy of the confidential document either through scanning or copying, the multi-function device stops or blocks the confidential document immediately based on detection of the IR mark. In simple words, access to content of the confidential document is blocked. A blank page is output as a result of the copy or scan operation.

Taking an example where a user may need to send his PAN card to a passport agency. The user submits a printed copy to an agent, the printed copy includes an IR mark. The agent now requires creating a copy of the PAN card for a passport database. When the agent tries to scan using any device, such as a multi-function device, a scanner, the device identifies the IR mark, and thus stops scanning or blocks access to the content of the PAN card. This approach may work fine when the whole document is confidential, and/or when the user does not want anyone to create a second copy of his document.

But there can be scenarios, where a portion of the document is confidential for the user while remaining portion is non-confidential for him. For such cases too, the user shares his document with other users such as bank agent, or passport agent but still wants to secure the confidential data such as passport number. In such cases, the above approach of blocking may not work for the user and further may create confusion and frustration for the agent as well as for the user. In addition, the task of maintaining the user's document in the passport database remains incomplete. In this light, there is a need for improvised methods and systems to secure confidential content in the document based on the user requirement and/or preference or other case scenarios.

SUMMARY

According to aspects illustrated herein, a method for allowing a user to secure confidential content of a document while printing the document is disclosed. The method includes receiving a print request to print the document. Then, a user interface is provided to the user including a secure option, wherein the secure option further includes a partial secure option to secure partial content of the document. Based on the selection of the partial secure option, a selection of a confidential area including the confidential content in the document is received. Based on the selection of the confidential area in the document, one or more coordinates of the confidential area including the confidential content in the document are calculated. The document, the selection of the partial secure option and the one or more coordinates of the confidential area including the confidential content in the document are sent for further processing. The document, the selection of the partial secure option and the one or more coordinates of the confidential area including the confidential content in the document is received for printing. Then, an infrared (IR) mark is embedded in the document while printing. While embedding the IR mark in the document, the one or more coordinates of the confidential area including the confidential content in the document is embedded in the IR mark. Finally, a printed document is output including the IR mark having the one or more coordinates of the confidential area, upon completion of printing the document.

According to further aspects illustrated herein, a method for protecting confidential content of a user while generating one or more copies of a printed document is disclosed. The method includes receiving the printed document including an infrared (IR) mark that further includes one or more coordinates of a confidential area including confidential content in the printed document. Then, the printed document is scanned. While scanning the printed document, the IR mark in the document is identified. Then one or more coordinates of the confidential area as stored in the IR mark are identified and retrieved. Based on the one or more coordinates of the confidential area, the confidential content included in the confidential area is masked using one or more methods, while generating the one or more copies of the printed document, thereby securing the confidential content of the user.

According to furthermore aspects illustrated herein, a method for protecting confidential content of a document while reproducing the document is disclosed. The method includes receiving a print request from a user to print the document. A user interface is provided to the user including a secure option, wherein the secure option further includes a partial secure option to secure partial content of the document. Based on the selection of the partial secure option, a selection of a confidential area including the confidential content in the document is received. Based on the selection of the confidential area in the document, one or more coordinates of the confidential area including the confidential content in the document are calculated. An infrared (IR) mark is embedded in the document. The one or more coordinates of the confidential area are embedded in the IR mark, while embedding the IR mark in the document. A printed document is output including the IR mark having the one or more coordinates of the confidential area for later use and/or access, upon completion of printing the document. Then, a request for printing is received for reproducing the printed document with the IR mark including the one or more coordinates of the confidential area. Based on the one or more coordinates in the IR mark, the confidential area including the confidential content is identified. While one or more copies of the printed document are reproduced, the confidential area including the confidential content is masked, while remaining content is output as-is. This way, the confidential content (instead of the whole document) for the user can be secured.

According to further aspects illustrated here, a system for allowing a user to secure confidential content of a document while printing the document is disclosed. The system includes a print driver and a multi-function device communicatively coupled to the print driver. The print driver is for: receiving a print request from the user to print the document; providing a user interface to the user having a secure option, wherein the secure option further includes a partial secure option to secure partial content of the document; based on the selection of the partial secure option, receiving a selection of a confidential area including the confidential content in the document; based on the selection of the confidential area in the document, calculating one or more coordinates of the confidential area in the document; and sending at least the document and the one or more coordinates of the confidential area including the confidential content in the document for further processing. The multi-function device is for: receiving at least the document and the one or more coordinates of the confidential area including the confidential content for printing; embedding an infrared (IR) mark in the document while printing; embedding the one or more coordinates of the confidential area including the confidential content in the IR mark, while embedding the IR mark in the document; and outputting a printed document including the IR mark that further includes the one or more coordinates of the confidential area, upon completion of printing the document.

According to further aspects illustrated here, a multi-function device for protecting confidential content of a user while generating a copy of a document is disclosed. The multi-function device includes a scanning platform for receiving a printed version of the document including an IR mark that further includes one or more coordinates of a confidential area including the confidential content in the printed document. The multi-function device includes a scanner for scanning the document. The multi-function device further includes a controller for: identifying the IR mark, while scanning the printed document; identifying and retrieving the one or more coordinates of the confidential area stored in the IR mark; based on the one or more coordinates of the confidential area, masking the confidential content in the confidential area using one or more methods, while generating a copy of the printed document, thereby securing the confidential content of the user.

According to additional aspects illustrated here, a device for protecting confidential content of a document while reproducing the document is disclosed. The device is for: receiving the document for printing from a user; before printing, providing a user interface to the user having a secure option, wherein the secure option further includes a partial secure option to secure partial content of the document; based on the selection of the partial secure option, receiving a selection of a confidential area including the confidential content in the document; based on the selection of the confidential area in the document, calculating one or more coordinates of the confidential area including the confidential content in the document; embedding an infrared (IR) mark in the document; embedding the one or more coordinates of the confidential area representing the confidential content, while embedding the IR mark in the document; outputting a printed document including the IR mark further including the one or more coordinates of the confidential area, upon completion of printing the document for later use and/or access; receiving a request for reproducing the printed document including the IR mark that further includes the one or more coordinates of the confidential area; based on the one or more coordinates in the IR mark, identifying the confidential area including the confidential content; and while reproducing one or more copies of the printed document, masking the confidential area including the confidential content while remaining content is output as-is.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

Figure 1A:
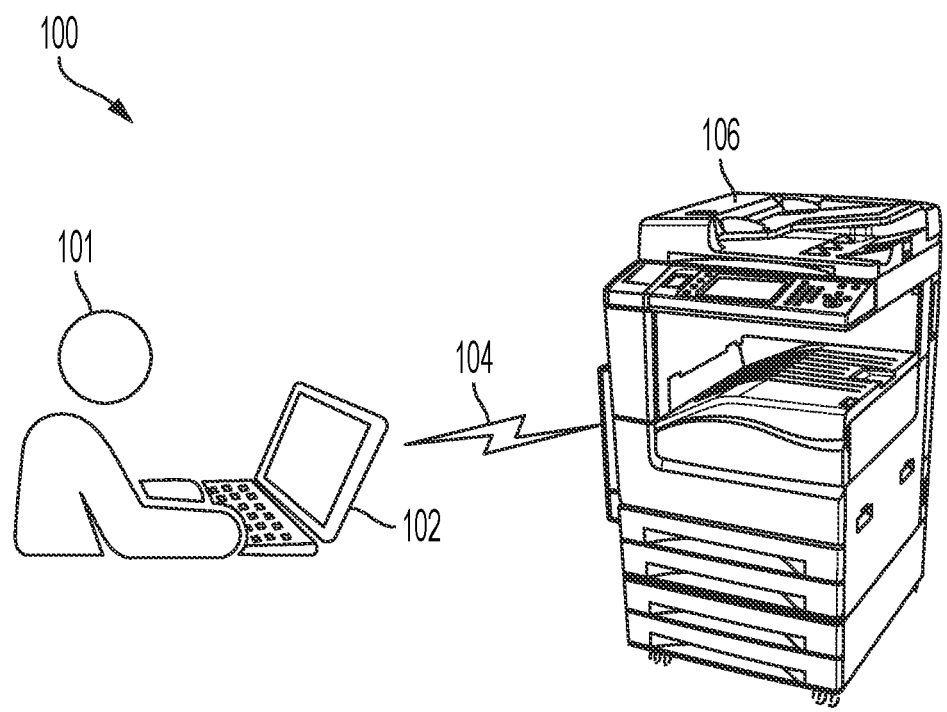
FIG. 1A illustrates an exemplary environment in which various embodiments of the disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or a combination thereof. In context of the current disclosure, the multi-function device secures content of a document while printing and/or while generating one or more copies of the printed document. The content to be secured may be confidential content for a user or otherwise refers to content that the user wishes to secure. Specifically, the multi-function device secures partial content of the document based on his requirement and/or preference.

The term "document" refers to a document submitted for printing, wherein the document includes content in form of text, image, graphics, or a combination thereof. The document may be in the form of a digital version or an electronic version of the document. The document when printed refers to a printed version of the document or a printed document. The document may be an original. The document herein includes at least confidential content that the user wishes to secure. The document may be referred to as a confidential document. Various examples of such confidential documents may be, but not limited to, personal documents such as PAN cards, Aadhaar cards, cheques, legal documents, bank bonds, research data, contract documents, prescriptions, coupons, tickets, invoices, or disclosure documents.

The term "copy or copies" refers to reproducing content of/from the printed version of the document using at least one of: a scanning operation or a copying operation. The copy can include an image derived from an optical scan of the printed document that can be considered for subsequent printing and/or other imaging operations. The copy of the document may be output in the form of a digital version or an electronic version of the document such as PDF, PNG, etc. Alternatively, the output can be in the physical form such as printed on paper.

The term "IR mark" refers to a mark added/printed/embedded in the document at the time of printing to ensure its authenticity/genuineness/originality/confidentiality. The IR mark can be in the form of text, or image. The IR mark can be referred to as IR security mark, or security mark. In context of the current disclosure, the IR mark includes coordinate information of a confidential area representing the confidential content of the document.

The term "IR mark portion" refers to include a background region and an actual IR mark, also referred to as IR marked region. The IR mark portion refers to an area in the document where the IR mark is present along with background or covered with invisible color/ink/patch and so on.

The term "halftone frequency" refers to a number of dots per linear inch measured along an axis of each row of pixels in the IR mark.

The term "confidential area" refers to an area in the document that includes confidential content/information for/of the user. The confidential content may be personal information of the user or otherwise confidential for the user.

The term "confidential content" refers to content that the user wants to secure and/or further does not want to share it with anyone. For example, the confidential content may be personal information of the user.

The term "coordinates" refer to dimensions of the confidential area in terms of x coordinate, y coordinate, height, or width. These are few examples, but other dimensions or coordinates details of the confidential area may be considered for implementation.

The term "computing device" refers to a device that a user typically uses for his day-to-day work such as to send emails, receive emails, view emails and other purposes. Examples of the computing device include, but are not limited to, a personal computer, a desktop, a laptop, a mobile phone, a tablet, a Personal Digital Assistant (PDA), a smart-phone or any other device capable of sending and receiving emails. The computing device includes one or more applications such as print driver applications. In context of the current disclosure, the print driver includes an option to secure partial content of the document.

The term "partial content" includes any portion of content in the document except the whole document, such half content of the document, more than half content of the document, less than half content of the document, a particular field/information/portion in the document or the like.

The term "user" refers to any user who wishes to secure content of the document. The user submits his document for printing and performs tasks such as selection of the partial secure option, selection of the confidential area/content and so on. The term "other users" refer to any other user who has a printed document of the user with the IR mark and tries creating one or more copies of the user's document. Examples of such other users may be a bank agent, a passport agent, or any other user of an organization such as bank, passport, respectively. These are few examples for understanding purpose without limiting the scope of the disclosure.

The term "same multi-function device" refers to the multi-function device that prints the document with the IR mark such that the IR mark includes coordinate information of the confidential content. The term "different multi-function device" refers to a multi-function device different from the multi-function device that prints the document with the IR mark such that the IR mark includes coordinate information of the confidential content. The different multi-function device can be a networked multi-function device i.e., a multi-function device which is communicatively coupled to the multi-function device. Alternatively, the different multi-function device can be a standalone multi-function device that is configured to perform functionalities required for securing confidential content at the time of generating one or more copies. The terms "same multi-function device" or "different multi-function device" are considered when any other user submits a printed version of the document including the IR mark with coordinate information of the confidential content. For example, when another user such as user A submits a printed version of the document to a multi-function device such as multi-function device A, for generating copies, then it is checked whether the multi-function device A is same as the multi-function device that outputs the printed document with the IR mark having coordinate information of the confidential content.

The present disclosure can be implemented for scan operation or copy operation to reproduce the content in any form that can be in the digital form or can be in the physical form.

Overview

The present disclosure discloses methods and systems to secure content of a document at the time of printing and/or at the time of reproducing the printed document at later time. At the time of printing, a user selects confidential content in the document that needs to be secured. For example, user confidential content can be like Social Security Number (SSN), Adhaar number, passport number, etc. At the time of printing, an IR mark is included in the printed document such that IR mark includes/stores coordinate information such as height, width, etc., of the confidential content. The inclusion of the IR mark with the coordinate information indicates that the printed document includes the confidential content.

While scanning/copying, it is checked whether the printed document includes confidential content or whether it is confidential document based on the presence of IR mark detection. If found, then those IR marked regions are hidden/blanked out in a final scan or copy output, thereby securing the confidential content.

The present disclosure can be implemented for scenarios where a user requires to fill out various application forms for different purposes. For example, the application forms may be needed for opening a bank account, applying for a credit/debit card, getting admission to schools/colleges, applying for a passport, applying for a visa, etc. The user fills-out these application forms and submit these to the concerned organization such as banks, colleges, schools, recruitment agencies, passport offices, visa offices and so on. At the time of submitting these application forms, the user requires to submit any ID proof such as permanent account number (PAN) card, address proof, driving license, passport, and so on. For example, if the application form is a bank form, then the documents for submission may be identity proof such as PAN card, address proof such as driving license, passport, and so on. But, if the application form is a college application form, then the documents for submission may include an address proof such as a passport, a mark sheet, a passing certificate, or the like. It can be considered that the user prints the PAN card and submits to an agent such as bank agent.

According to the implementation of the disclosure, the user marks the PAN card number as confidential content and wants to secure his PAN card number so that it is not later misused by anyone at the bank or any other users who accidentally receive the PAN card copy and try to create one or more copies of the same. So here, the PAN card is printed with the IR mark including coordinate information of the confidential content such as PAN number. When any other user creates one or more copies from the printed PAN card, the PAN card number is hidden/masked. This way, the disclosure secures confidential content of the user.

Exemplary Environment

FIG. 1A refers to an exemplary environment 100 in which various embodiments of the disclosure can be practiced. The environment 100 includes a computing device 102 and a multi-function device 106. The computing device 102 and the multi-function device 106 are communicatively coupled via a network 104. Various examples of the computing device 102 include, but are not limited to, a personal computer, a desktop, a laptop, a mobile phone, a tablet, a Personal Digital Assistant (PDA), a smart-phone or any other device. The network 104 may be wired, wireless, or any combination of wired and wireless communication networks, such as cellular, Internet, local area networks, or the like. Although, the environment 100 is shown to include the mufti-function device 106 but the environment 100 may include a printer, multi-function printer or any device with printing and/or scanning functionality with a feature of IR mark. The computing device 102 and the multi-function device 106 operate in conjunction with each other to secure confidential content of a user 101 in a document.

Figure 3A:
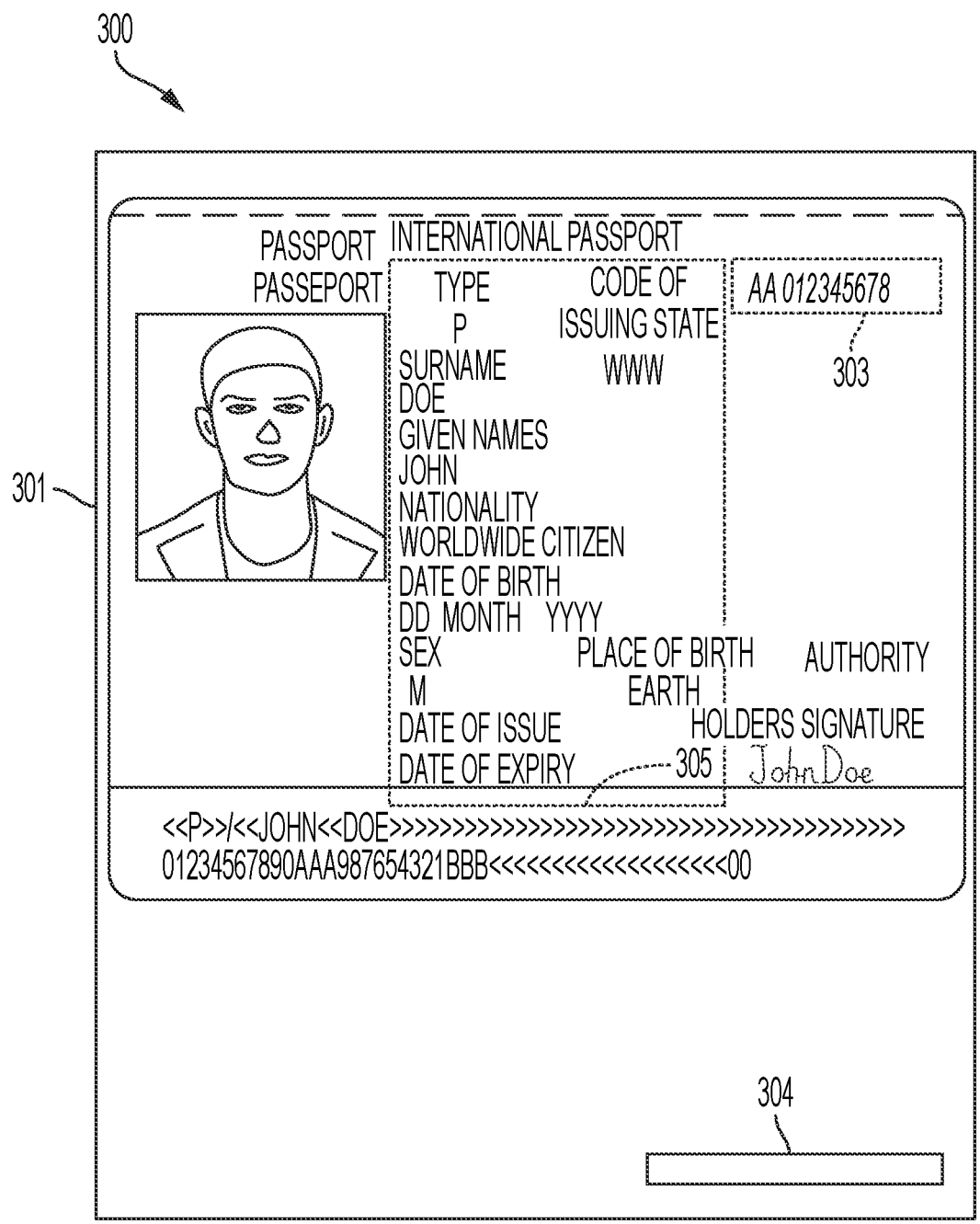
FIGS. 3A-3E represent exemplary snapshots for implementing the current disclosure.

According to the environment 100 of FIG. 1A, the user 101 uses the computing device 102 to select and submit the document for printing to the multi-function device 106. While selecting the document for printing, the computing device 102 allows the user to select confidential content from the document. Based on the selection of the confidential content, the computing device 102 identifies dimensions/coordinates of an area including the confidential content. The computing device 102 then sends the document and the calculated dimensions of the confidential area to the mufti-function device 106 for further processing. The multi-function device 106 receives the document and the calculated dimensions of the confidential area. Based on the received details, the multi-function device 106 identifies that the document is a confidential document, and the selected content of the document needs to be secured. Based on the identification, the multi-function device 106 embeds an IR mark in the document at the time of printing, While embedding the IR mark, the multi-function device 106 embeds the dimension details of the confidential area/content in the IR mark for later identification, retrieval and/or use. An example of the printed document with the IR mark (such as 304) including the dimension details of the confidential area/content is shown in FIG. 3A. This way, the multi-function device 106 secures the confidential content of the document while printing the document.

Here, the multi-function device 106 secures the confidential content of the document such that at the time of creating one or more copies of the printed document at any time later (at the same multi-function device such as 106 or any other multi-function device such as 122 of FIG. 1C, scanner, or copier), the confidential content as selected/marked by the user is masked/hidden, i.e., not shown to any other users.

Figure 1B:
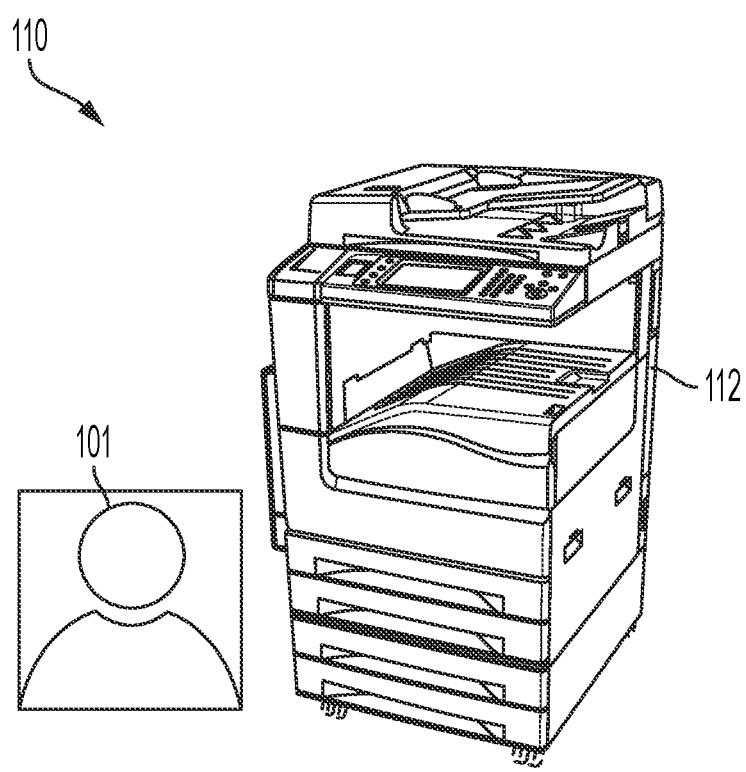
FIG. 1B represents another exemplary environment in which various embodiments of the disclosure can be practiced.

FIG. 1B shows another exemplary environment 110 in which various embodiments of the disclosure can be practiced. According to the environment 110 of FIG. 1B, the multi-function device 112 alone implements functionalities of the disclosure i.e., secures confidential content of the user 101. In such environment 110, the user 101 can directly select the document for printing at the multi-function device 112. For example, the document can be selected from a portable storage device attached to the multi-function device 112. In another example, the document can be selected from a cloud location accessible through the multi-function device 112. In further example, the document can be selected from a network location accessible through the multi-function device 112. In further example, the document can be stored in a memory of the multi-function device 112 and can be directly selected from its memory. These are few examples but the user 101 can select the document for printing directly at the multi-function device 112 using other known or later developed ways.

While selecting the document for printing, the multi-function device 112 provides a user interface to the user to select confidential content from the document. Based on the selection of the confidential content, the multi-function device 112 identifies dimensions of an area including the confidential content. Post identification, the multi-function device 112 initiates printing and embeds an IR mark in the document at the time of printing. While embedding the IR mark in the document, the multi-function device 112 embeds the dimension details of the confidential content in the IR mark for later identification/retrieval of the confidential content and/or use. This way, the multi-function device 112 secures the confidential content of the document.

Here, the multi-function device 112 secures the confidential content of the document such that at the time of creating one or more copies of the printed document at any time later (at the same multi-function device such as 112 or any other multi-function device such as 122 of FIG. 1C, scanner, or copier), the confidential content as selected by the user is masked/hidden, i.e., not shown to other users.

The environment 100 of FIG. 1A allows the user 101 to submit document for printing through his computing device such as 102, while the environment 110 of FIG. 1B allows the user 101 to directly select the document for printing at the multi-function device such as 112. Accordingly, the functionality of allowing the user 101 to select the confidential content and dimension calculation can be done directly at the computing device 102 of FIG. 1A, while the functionality of allowing the user 101 to select the confidential content and dimension calculation can be done directly at the multi-function device 112 as shown in FIG. 1B.

Figure 1C:
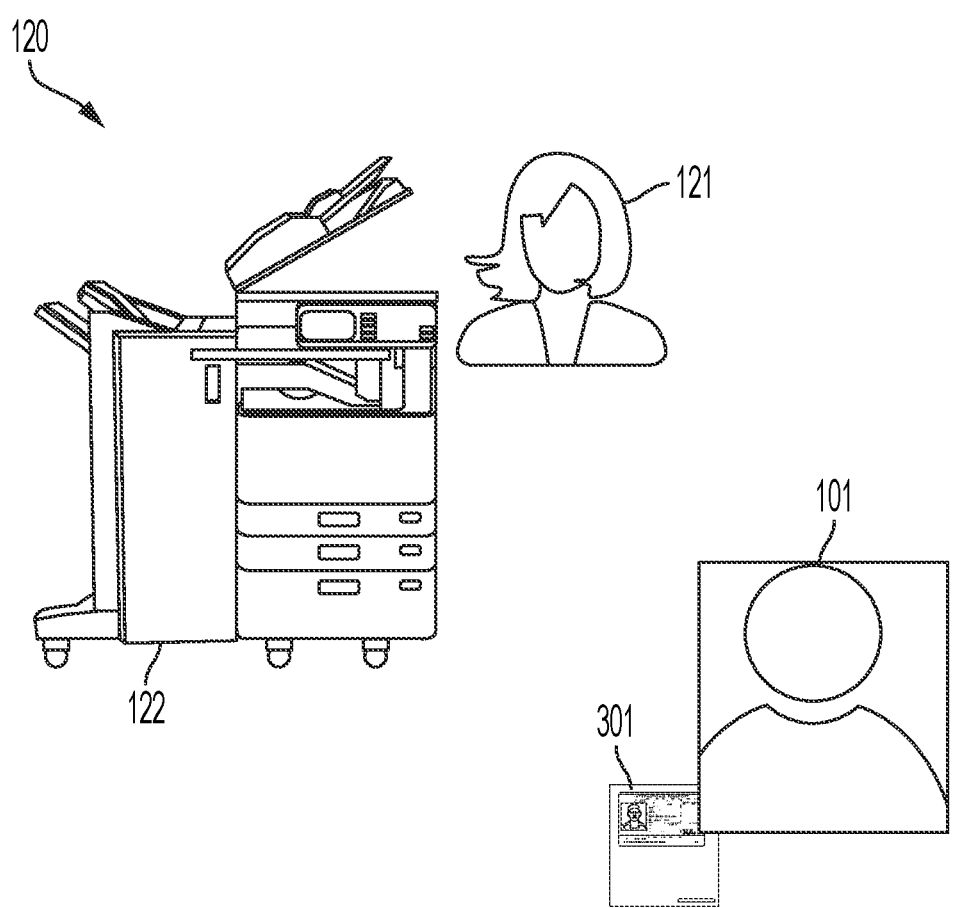
FIG. 1C represents one exemplary implementation of the present disclosure.

Once the printed document is output with the IR mark including the coordinate details of the confidential content/area according to FIG. 1A or FIG. 1B, the user 101 submits the printed document (shown as 301) with the IR mark to another user such as an agent 121 for various purpose as shown in exemplary implementation 120 in FIG. 1C. Later when the agent 121 tries to create one or more copies of the printed document 301 using any multi-function device such as 106, 112 or a different multi-function device such as 122. According to FIG. 1C, it can be considered that the agent 121 uses a different multi-function device such as 122 for creating one or more copies of the printed document 301. The multi-function device 122 masks the confidential content based on the IR mark, while reproducing the copies of the printed document 301. Here, the multi-function device 122 outputs a copy where the confidential content such as 303 is masked/hidden as clearly seen in FIG. 3E. This way, the disclosure not only secures confidential content at the time of printing but further ensures the confidential content remains confidential to the user and is not shared with any other users.

Exemplary System

Figure 2A:
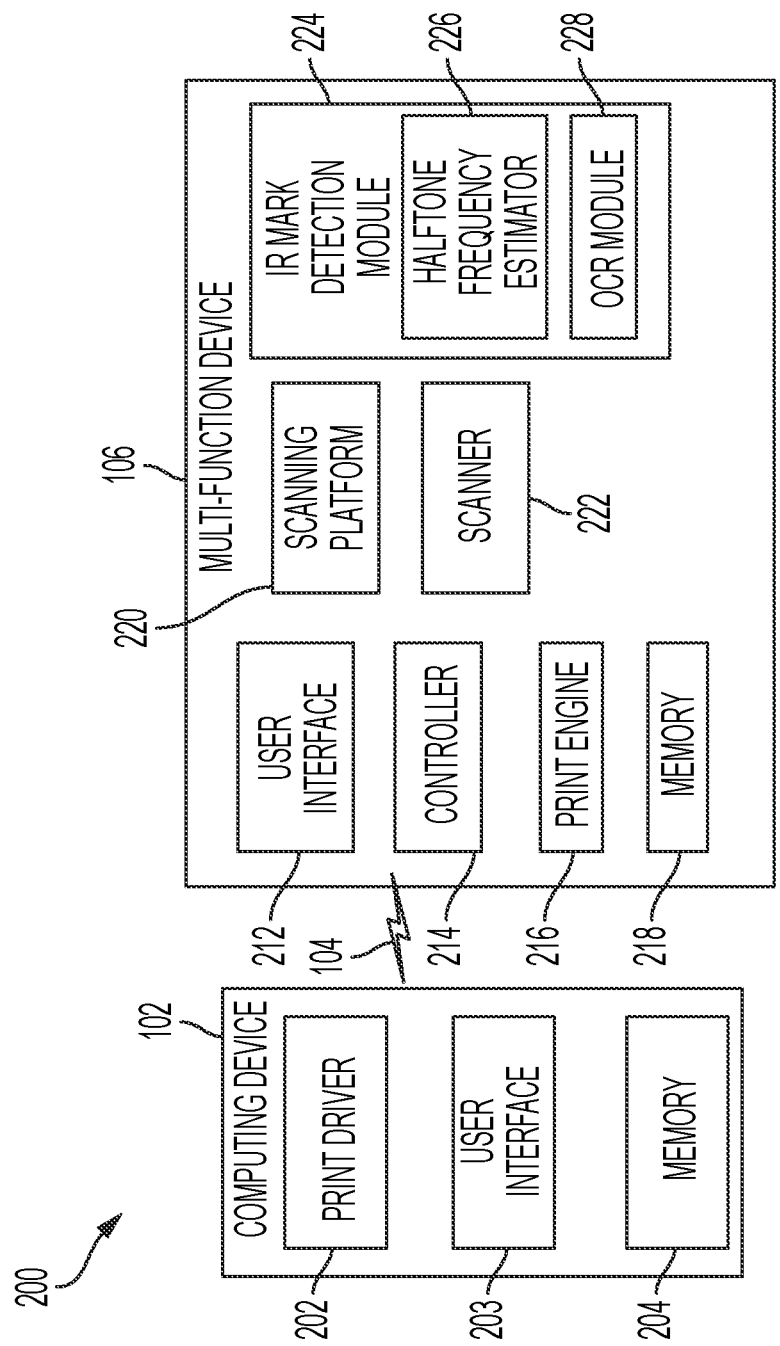
FIG. 2A is a block diagram of a system for securing confidential content of a document, according to an embodiment of the present disclosure.

FIG. 2A shows a block diagram of a system 200 for securing confidential content of the document. The document includes content in form of text, image, graphics, or a combination thereof. Various examples of the document may be, but not limited to, such as PAN cards, Aadhaar cards, cheques, legal documents, bank bonds, research data, passports, contract documents, prescriptions, coupons, tickets, invoices, or disclosure documents. The document may include confidential content and non-confidential content of the user. For example, in an invoice, payment terms, buyer and seller details may correspond to the confidential content, while other details such as products and/or services may correspond to the non-confidential content. Likewise, in an identity document, an identity number such as SSN may correspond to the confidential content and other information such as name may correspond to the non-confidential content.

The system 200 includes the computing device 102 and the multi unction device 106 communicatively coupled via the network 104. The computing device 102 includes a print driver 202, a user interface 203 and a memory 204. The multi-function device 106 further includes a user interface 212, a controller 214, a print engine 216, and a memory 218. The components 212-218 may be implemented for securing the confidential content of the document at the time of printing, specifically for printing an IR mark embedded with coordinate details of the confidential content of the document. The mufti-function device 106 further includes a scanning platform 220, a scanner 222, an IR mark detection module 224. The IR mark detection module 224 includes a halftone frequency estimator 226, and an Optical Character Recognition (OCR) module 228. The components 220-228 may be implemented for securing the confidential content of the document at the time of scanning, specifically, for masking the confidential content at the time of creating one or more copies such that the confidential content is not visible to any other user.

Each of the components 212-218, 220-228 are coupled to each other via a communication bus or later developed protocols and each of the components communicate with each other for protecting/securing documents. Each of the components 212-218, 220-228 are coupled to each other via a communication bus or later developed protocols and each of the components communicate with each other for protecting/securing documents. The multi-function device 106 may include one or more additional components as required to implement the present disclosure.

The print driver 202 of the computing device 102 may be implemented by computer executable program instructions. The memory 204 may be any computer-readable medium known in the art, related art, or developed later including, for example, volatile memory (e.g., RAM), non-volatile memory (e.g., flash memory, etc.), disk drive, and the like.

In operation, the user selects and submits a document for printing. The document selected for printing may be stored in the memory 204. Alternatively, the document may be obtained from an external storage media (e.g., a compact disk, a flash drive, a memory card, etc.) or via other devices (e.g., a mobile phone, a server, etc.) through various interfaces (e.g., Universal Serial Bus (USB) port, Peripheral Component Interconnect (PCI) port, etc.).

Specifically, the user submits a print request through the print driver 202. The user interface 203 of the print driver 202 allows the user to select the document for printing and submit one or more print parameters such as black&white/color, output, quality, orientation, destination, double side/single side and so on, required for printing. The print driver 202 or the user interface 203 of the print driver 202 includes an option to secure content of the document. In context of the current disclosure, the print driver 202 includes a partial secure option to secure a portion of the document that can be confidential for the user, or otherwise that the user wishes to secure.

The user selects the partial secure option. Selecting the partial secure option further allows the user to select confidential content in the document that the user wishes to secure or allows the user to select a confidential area including the confidential content. This way, the print driver 202 receives the print request including the document and the selection of the confidential area/content that the user wishes to secure.

Based on the user selection, the print driver 202 calculates one or more coordinates of the confidential area including the confidential content in the document. The one or more coordinates of the confidential area may include at least: x coordinate, y coordinate, height, or width of the confidential area. Any known or later developed algorithms can be used to calculate x, y, height and width coordinates. Post calculating, the print driver 202 sends the document, the print parameters, the selection of the partial secure option, and the one or more coordinates of the confidential area to the multi-function device 106 via the network 104, for further processing.

Securing at the Time of Printing

The multi-function device 106 receives the document, the print parameters, the selection of the partial secure option by the user, and the one or more coordinates of the confidential area including the confidential content. Specifically, the controller 214 receives the details from the print driver 202 such as the document, the print parameters, the selection of the partial secure option by the user, and the one or more coordinates of the confidential area including the confidential content. The controller 214 analyzes these details as received from the print driver 202. Based on the selection of the partial secure option by the user, the controller 214 recognizes that the content of the document needs to be secured at the time of printing.

The controller 214 then instructs the print engine 216 to initiate printing of the document according to the print attributes as received from the print driver 202. To secure the content of the document, the print engine 216 includes a security mark, such as IR mark, in the document. Specifically, the print engine 216 embeds the IR mark in the document. The IR mark may be included at any pre-defined location in the document such as bottom of the document, top corner of the document, or any other location as required by the user.

In context of the current disclosure, the print engine 216 embeds the one or more coordinates of the confidential area in the IR mark while embedding the IR mark in the document. This way, the multi-function device 106 secures the content of the document or partial document by embedding the IR mark having the coordinates information of the confidential content for later use and/or retrieval. This way, the multi-function device 106 outputs the printed document having the IR mark embedded with the coordinate information for later retrieval and/or use. The inclusion of the IR mark with the coordinate information in the document indicates the document or a portion of the document is confidential.

The IR mark is embedded with coordinates details/information of the confidential content such that when any user tries to create one or more copies of the printed document at any device such as 106 or different multi-function devices such as 112, 122, the confidential content is masked or hidden based on the coordinate information of the confidential content. More structural and implementation details will be discussed below.

Figure 2B:
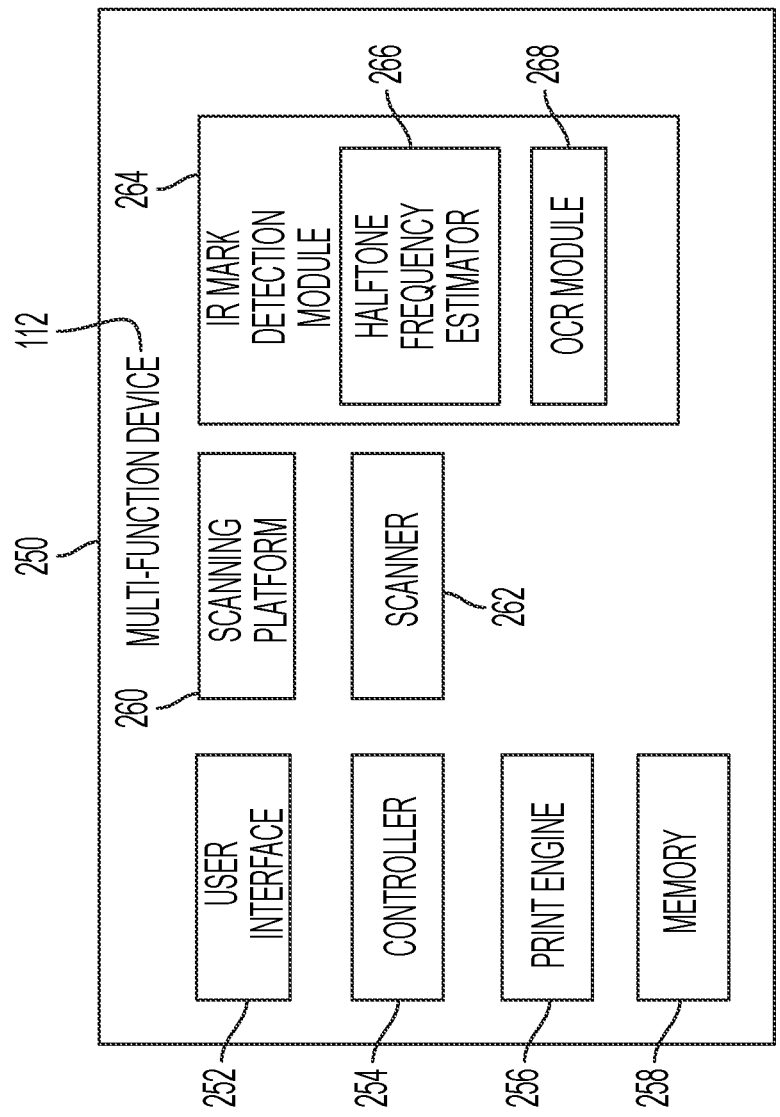
FIG. 2B is another block diagram of a system for securing confidential content of a document, according to an embodiment of the present disclosure.

In the system 200 as shown in FIG. 2A, the functionality of securing content of the document while printing, is implemented using a combinational device such as a computing device 102 and a multi-function device such as 106. For example, some functionalities are implemented at the computing device such as 102 i.e., the computing device 102 identifies the confidential area and calculates the coordinate information of the confidential area, and some functionalities are implemented at the multi-function device 106 i.e., to embed the coordinate information in the IR mark while printing the document. But there can be scenarios where the entire functionality can be incorporated and implemented at a single device such as a multi-function device 112 as shown in FIG. 2B. The multi-function device 112 identifies the confidential area, calculates coordinate information, and embeds the coordinate information in the IR mark while printing the document. Such scenarios are discussed in detail in conjunction with FIG. 2B.

FIG. 2B shows a block diagram of a system 250 for securing the confidential content of the document. The system 250 includes a multi-function device such as 112. The multi-function device 112 further includes a user interface 252, a controller 254, a print engine 256, and a memory 258. The components 252-258 may be implemented for securing the confidential content at the time of printing, specifically for printing an IR mark embedded with coordinate details of the confidential content of the document. The multi-function device 112 further includes a scanning platform 260, a scanner 262, an IR mark detection module 264. The IR mark detection module 264 includes a halftone frequency estimator 266, and an Optical Character Recognition (OCR) module 268. The components 260-268 may be implemented for securing the confidential content of the document at the time of scanning, specifically, for masking the confidential content at the time of creating one or more copies such that the confidential content is not visible to any other user.

In operation, the user selects and submits a document for printing. The document for printing can be selected as stored in the memory 258. Alternatively, the document may be obtained from an external storage media (e.g., a compact disk, a flash drive, a memory card, etc.) or via other devices (e.g., a mobile phone, a server, etc.) through various interfaces (e.g., Universal Serial Bus (USB) port, Peripheral Component Interconnect (PCI) port, etc.).

Specifically, the user selects and submits a document for printing through the multi-function device 112. At the time of submitting, the user submits one or more print parameters such as black&white/color, output, quality, orientation, destination, double side/single side and so on. The multi-function device 112 provides a user interface 252 that includes an option to secure content of the document. In context of the current disclosure, the user interface 252 includes a partial secure option to secure a portion of the document that can be confidential for the user or otherwise that the user wishes to secure.

The user selects the partial secure option. Selecting the partial secure option further allows the user to select confidential content in the document that the user wishes to secure or allows the user to select a confidential area including the confidential content. This way, the user interface 252 allows the user to submit the print request including the document, the print parameters, and the selection of the confidential area/content that the user wishes to secure.

Based on the user selection of the confidential content, the controller 254 calculates one or more coordinates of the confidential area including the confidential content in the document. The one or more coordinates of the confidential area may include at least: x coordinate, y coordinate, height, or width of the confidential area.

The controller 254 then instructs the print engine 256 to initiate printing of the document according to the print attributes as submitted by the user. The controller 254 further instructs the print engine 256 to embed a security mark, such as IR mark, in the document. Specifically, the print engine 256 embeds the IR mark in the document. The IR mark may be included at any pre-defined location of the document such as bottom of the document, top corner of the document, or any other location as required by the user.

In context of the current disclosure, the print engine 256 embeds the one or more coordinates of the confidential area in the IR mark while embedding the IR mark in the document. Finally, the multi-function device 112 outputs the printed document having the IR mark embedded with the coordinate information for later identification, retrieval and/ or use. The inclusion of the IR mark in the document indicates that the document or a portion of the document is confidential. This way, the multi-function device 112 secures the content of the document or partial document by embedding the IR mark having the coordinate information of the confidential content.

The IR mark is embedded with coordinate information of the confidential content such that when any user tries to create one or more copies of the printed document at any device such as the same multi-function device 112 or different multi-function devices such as 106, 122, the confidential content is masked or hidden based on the coordinate information of the confidential content. More details will be discussed below.

Securing at the Time of Generating Copies

It can be considered that a user tries to create one or more copies from the printed document. The copies can be created either via a scanning operation or via a copy operation. The user here can be a user different from the user who prints the document for submission. For example, the different user can be a bank agent, a passport agent, or any other user. The agent can use any device for creating copies such as the same multi-function device 106 i.e., the multi-function device 106 used for printing the document (see FIG. 1A), the multi-function device 112 (see FIG. 1B). Alternatively, the agent can use a different multi-function device such as 122 (see FIG. 1C). In further example, the agent can use other devices such as a scanner, a copier or other equivalent devices with copying/scanning functionalities. For easy understanding, the disclosure is discussed with respect to the multi-function device 106, where the agent uses the same device i.e., the multi-function device 106 for copying and the multi-function device 106 secures confidential content while copying is in progress.

As shown in FIG. 2A, the multi-function device 106 includes the scanning platform 220. The scanning platform 220 may include a flat transparent glass bed under which Charge-Coupled Device (CCD) array, lamp, lenses, filters, and mirrors may be fixed. The printed document may be placed on the glass bed to scan the printed document. Alternatively, the scanning platform 220 may be an automatic document handler (ADH). The user places the printed document on the scanning platform 220 for creating one or more copies. The user then initiates copy operation either via a scan button provided on the multi-function 106 or otherwise included in the user interface 212 of the multi-function device 106.

The scanner 222 initiates scanning of the printed document page by page. The scanner 222 may include a scanner head and an electric motor (such as a stepper motor). The scanner head includes, for example, mirrors, lens, CCD sensors and filters. The electric motor moves the scanner head in parallel to the glass bed from one end of the glass bed to another end for scanning the printed document. This way, the scanner 222 scans the printed document placed on the glass bed of the scanning platform 220. The scanned image of the printed document is sent to the controller 214 for further processing.

The controller 214 analyzes the scanned image and further identifies whether the scanned image includes an IR mark. The controller 214 may be implemented by a combination of hardware and software. The "hardware" may include a combination of discrete components, an integrated circuit, an application-specific integrated circuit (ASIC), a field programmable gate array (FPGA), a processor, or other suitable hardware. The "software" may include one or more objects, agents, threads, lines of code, subroutines, separate software applications, two or more lines of code or other suitable software structures executable by the processor. The controller 214 may be implemented by computer executable program instructions.

Based on the identification of the IR mark in the scanned image, the controller 214 proceeds forward. If the controller 214 identifies the IR mark, the controller 214 then recognizes the document or scanned images includes confidential content. The presence of the IR mark indicates that the document includes confidential content. If the scanned image does not include any IR mark, the controller 214 proceeds with conventional ways.

Post identification, the controller 214 then extracts the IR mark portion included in the scanned image and sends the extracted IR mark portion to the IR mark detection module 224 for further processing. The IR mark portion includes the IR mark and a background region.

The extracted IR mark portion is in any pre-defined format for example, RGB format for further processing. The RGB format is a pixel format where each pixel of the IR mark has a pixel value corresponding to R channel, G channel and B channel. The RGB format is further converted into grayscale format i.e., black, and white format. The grayscale format again is representation of the data in pixel format. The grayscale format is further converted into binary format for further processing. Here all processing is performed on the binary file/image.

To determine the content in the IR mark, the halftone frequency estimator 226 estimates halftone frequency of the IR mark portion using any known or later developed methods. In one example, the halftone frequency estimator 226, identifies the IR mark based on color information. More details on the halftone frequency estimation are covered in Attorney File No. 20200578US01, Methods and Systems For Automatically Identifying IR Security Marks Based On Known Halftone Frequency And Color Information. In another example, the halftone frequency estimator 226 identifies the IR mark portion based on threshold values. More details on the halftone frequency estimation are covered in Attorney File No. 20200490US01, Methods and Systems For Automatically Identifying IR Security Marks In A Document Based On Halftone Frequency Information. Additionally, the present disclosure further incorporates content related to halftone frequency estimation as disclosed in U.S. Pat. No. 9,628,635, titled "Systems and methods for halftone frequency detection" in the name of Xerox corp; U.S. Pat. No. 7,424,151, titled "Method and system for image classification and halftone frequency detection" in the name of Xerox corp; U.S. Patent Publication No. 20080239342A1, "Method and system for detection of binary halftone frequencies", in the name of Xerox corp; These are just few examples, but any other known or later developed methods/systems may be implemented to estimate halftone frequencies for the present disclosure.

Using the known or later developed methods, the halftone frequency estimator 226 estimates the halftone frequency of the IR mark portion to separate the background region from the IR marked region/IR mark. As a result, the halftone frequency estimator 226 identifies all pixels forming the IR mark. Then, the halftone frequency estimator 226 performs one or more morphological operations to reconstruct/enhance the pixels forming the IR mark. This way, the halftone frequency estimator 226 identifies the IR mark region including the coordinate information of the confidential content.

Thereafter, the halftone frequency estimator 226 passes the identified pixels to an Optical Character Recognition (OCR) module 228. The OCR module 228 performs an OCR operation on the identified pixels to identify the content in the IR mark. In context of the current disclosure, the content here refers to the coordinate information such as x coordinate, y coordinate, height, and/or width of the confidential content. This way, the OCR module 228 identifies the coordinate information. The output (marked as 306) provided by the OCR module 228 is shown in FIG. 3D.

Once the IR mark detection module 224 identifies the coordinate information, the retrieved coordinate information is passed to the controller 214. Based on the coordinated information such as x coordinate, y coordinate, height and width, the controller 214 identifies the confidential area that includes the confidential content. Based on the identified confidential area, the controller 214 then determines/identifies the confidential content. Finally, while generating a scanned output/file, the controller 214 masks the identified confidential area including the confidential content such that the confidential content is not visible, while remaining content is output as-is. For example, the controller 214 may mask the confidential area/content using one or more methods such as blackening method, character blurring, character shuffling, or character substitution. As one example, the controller 214 merges the blank image (generated by the scanner 222 based on x, y, height, and width information) with the scanned output document generated by he scanner 222. Here, the mask plane refers to a full white image and size of the mask is same as x, y, height, and width information. It merges with the actual image based on the coordinate information. Finally, the controller 214 outputs the scanned file, where the confidential area including the confidential content is masked. This way, the multi-function device 106 secures the confidential content for the user such as user 101 when one or more copies are created from his document i.e., printed document. As a result, chances of misusing any confidential content of the user 101 are reduced.

The controller 214 may additionally generate a notification for the user who is performing the copy or scan operation. The notification is to indicate that the scanned file includes confidential content and may further notify that some content of the document is masked. Thereafter, the controller 214 sends the scanned file to a desired destination such as USB, email, cloud location, network location, a file server and so on. Here, the user can provide the required input.

Continuing with FIG. 2A description, the user interface 212 can be used for providing inputs to the multi-function device 106 and can further be used for displaying various information or notification to users. For example, the user who is scanning can provide his input on scan parameters such as scan type, output, destination and so on. In another example, the user interface 212 displays a message to the user "the scanned output includes a confidential content" and so on. In further example, the user interface 212 may display a pre-defined message to the user—"the document is secure". The user interface 212 may further display various options to receive various input from the user required for implementing the current disclosure.

The memory 218 stores all relevant information required for implementing the current disclosure. For example, the memory 218 temporarily stores the document for printing, print attributes, coordinate information, IR mark, scan parameters and so on. Any details stored in the memory 218 can be retrieved by the controller 214 or other components for implementing the current disclosure. The memory 218 may be any computer-readable medium known in the art, related art, or developed later including, for example, volatile memory (e.g., RAM), non-volatile memory (e.g., flash memory, etc.), disk drive, and the like.

Although securing content while creating copies is discussed with the components 220-228 of FIG. 2A. But it is understood that the components shown in FIG. 2B such as scanning platform 260, scanner 262, IR mark detection module 264, halftone frequency estimator 266 and OCR module 268 are similar to the components scanning platform 220, scanner 222, IR mark detection module 224, halftone frequency estimator 226 and OCR module 228, respectively of FIG. 2A. The components 260-268 are implemented in the same manner as discussed above for FIG. 2A, for securing the confidential content of the document at the time of scanning, specifically, for masking the confidential content at the time of creating one or more copies such that the confidential content is not visible to any other user.

The disclosure is discussed where the document includes confidential content at a single location. But there can be scenarios where the document includes confidential content at more than one location, for example, in left half and right half of the document. In such cases, the user may select a plurality of confidential areas, wherein each confidential area includes the confidential content to be secured. As a result, the computing device 102 or the multi-function device 112 may calculate coordinates of each confidential area of the plurality of confidential areas. While embedding the IR mark in the document, the coordinates of each confidential area of the plurality of confidential areas may be embedded. In some implementations, the number of IR marks embedded may be equal to a number the confidential areas selected by the user in the document, where each IR mark includes coordinates of a corresponding confidential area. For example, the user may select two confidential areas, namely, a first confidential area and a second confidential area. The print driver 202 or the multi-function device 112 calculates first coordinates and second coordinates corresponding to the first confidential area and the second confidential area, respectively. The multi-function devices 106 and 112 may embed a first IR mark for the first confidential area and the second IR mark for the second confidential area in the document. While embedding the first IR mark, the first coordinates may be embedded. While embedding the second IR mark, the second coordinates may be embedded. As a result, the first IR mark may include the coordinates of the first confidential area and the second IR mark may include the coordinates of the second confidential area. Finally, the multi-function devices 106, 112 may print the document including the first IR mark and the second IR mark.

While generating one or more copies of the printed document including the first IR mark and the second IR mark, the multi-function devices 106, 112 may mask the first confidential area and the second confidential area based on the coordinates in the first IR mark and the second IR mark to secure the confidential content in the printed document.

Figure 3B:
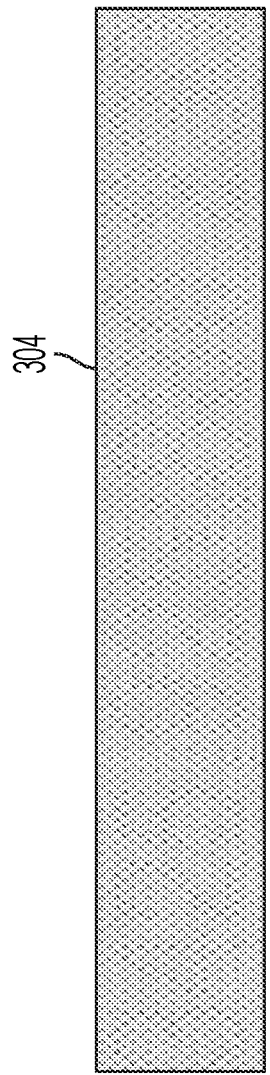
Figure 3C:
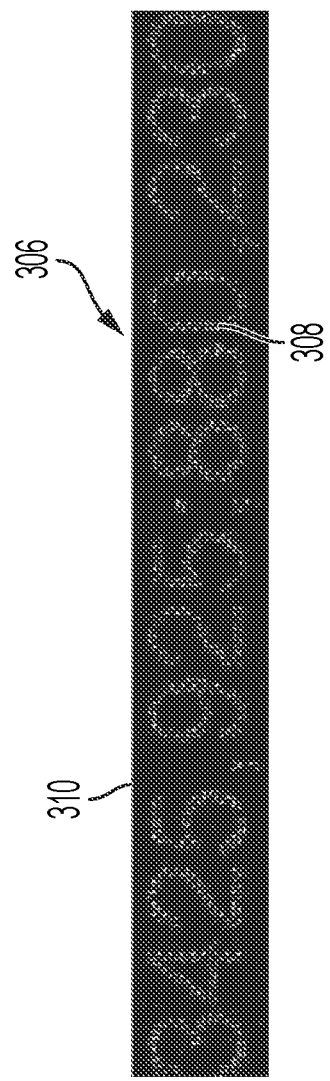
Figure 3D:
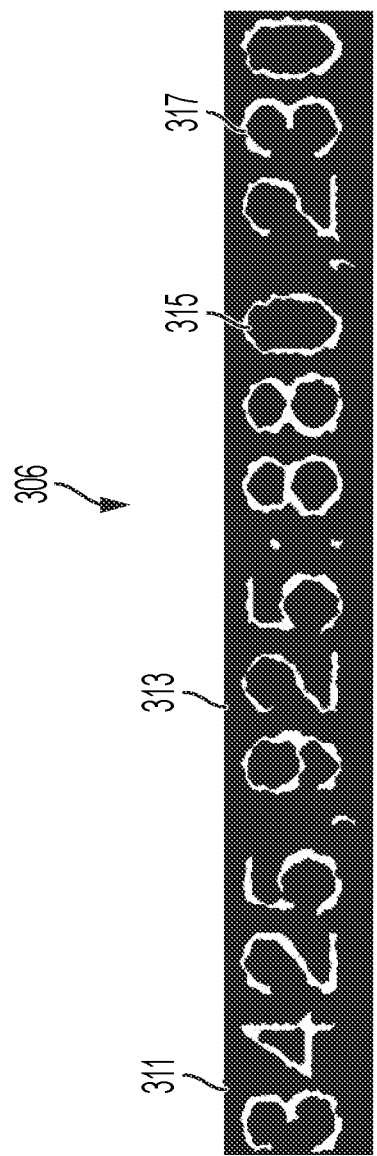
Figure 3E:

FIGS. 3A-3D represent exemplary snapshots for implementing the current disclosure. FIG. 3A shows a printed document according to the implementation of the present disclosure. The snapshot 300 shows a printed document such as passport 301 that includes content including confidential content and non-confidential content. For example, the confidential content may be passport number, marked as 303, while the non-confidential content refers to portion marked as 305. While printing the document 301, an IR mark 304 is printed. The IR mark 304 includes coordinate information of the passport number, marked as 303 for later identification of the confidential area/content While creating copies of the document 301 (at the time of scanning operation or copying operation), the IR mark 304 is extracted from the printed document for further processing as shown in FIG. 3B. Based on the processing such as halftone frequency estimation, background region is separated from the IR mark. As clearly shown in the snapshot 306 of FIG. 3C, white pixels (marked as 308) represent the IR mark, while black pixels (marked as 310) represent the background region. The IR mark represents/include the coordinate information of the confidential content. Further, when one or more morphological operations are performed on the white pixels marked as 308, pixels forming the IR mark is enhanced. As clearly shown in FIG. 3D, the coordinate information includes x coordinate marked as 311, y coordinate marked as 313, height marked as 315, and width marked as 317. Based on the coordinate information, the confidential area including the confidential content is identified. Based on the confidential area, confidential content is identified, which is then masked (masking shown as 320) as visible in the snapshot 318 of FIG. 3E, while the remaining content 305 (non-confidential content) is output as-is. Here the confidential content such as passport number, (see FIG. 3A, marked as 303) is masked/hidden in final scanned output/file 318. Thereby, the confidential content 303 of the document 301 is secured.

Exemplary Flowcharts

Figure 4A:
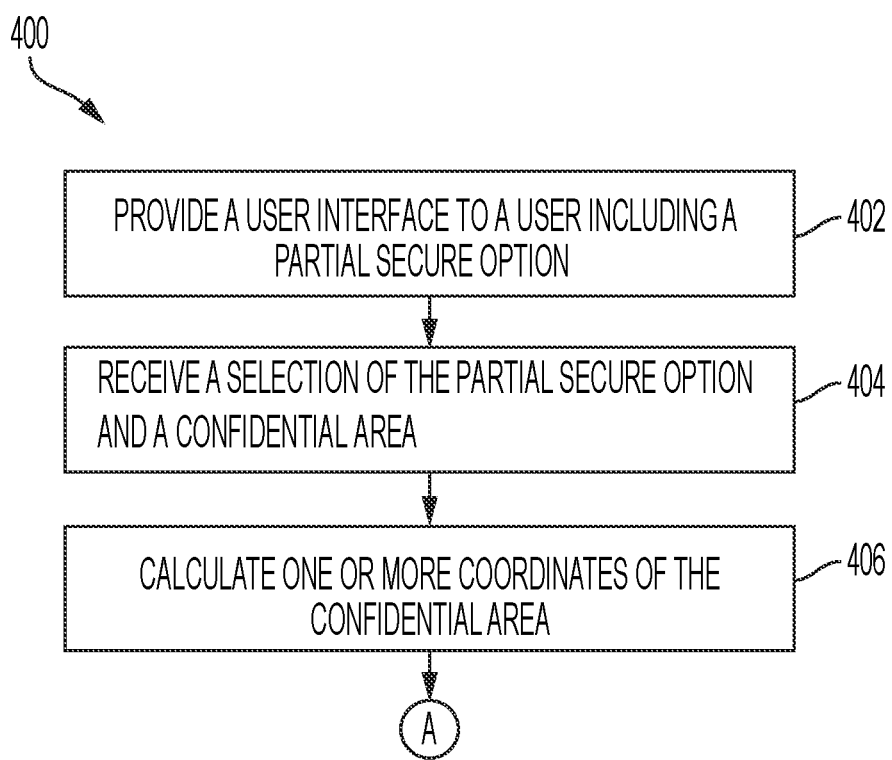
FIGS. 4A-4B represent a method for securing content of a document while printing the document.
Figure 4B:
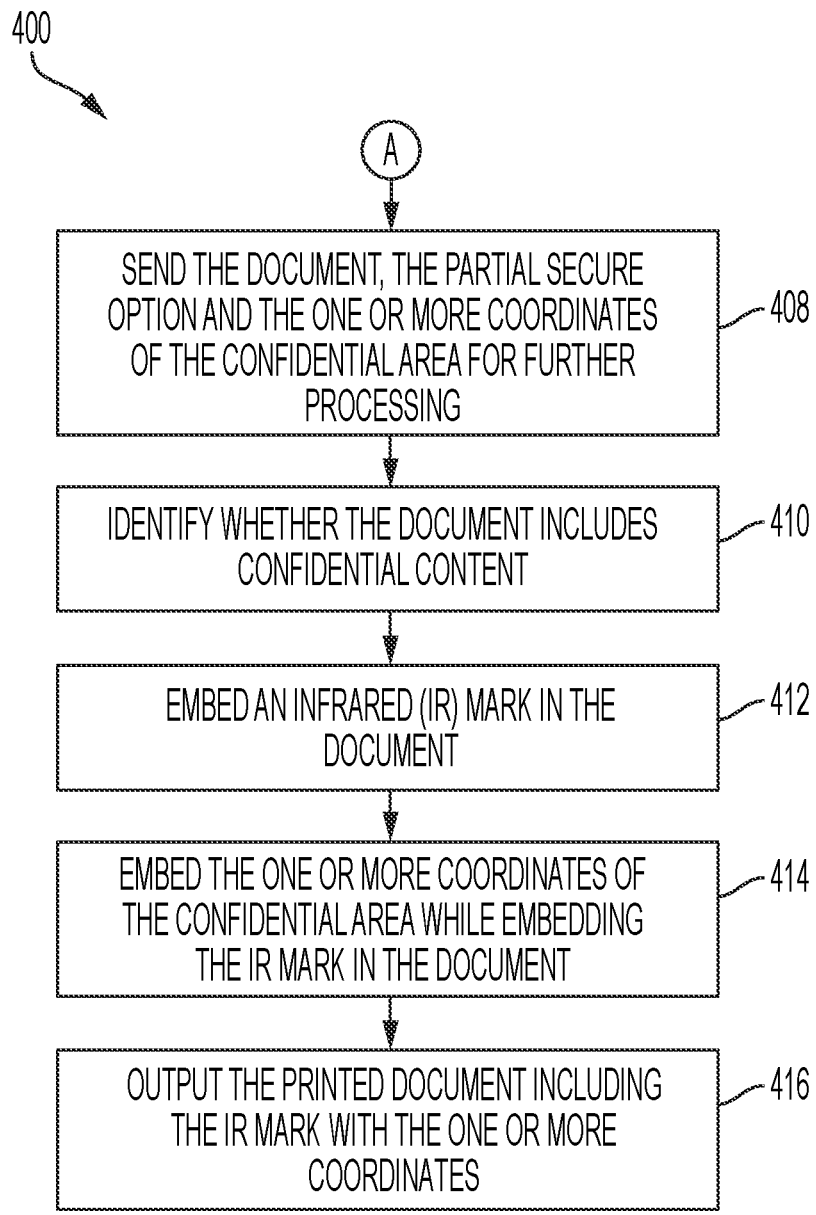

FIGS. 4A-4B represent a method flowchart 400 for securing content of a document, specifically, the method flowchart 400 embeds an IR mark including coordinate information of confidential content/area while printing the document. The method 400 can be implemented using a system including a computing device and a multi-function device. In another example, the method 400 can be implemented at a single device such as a multi-function device 112, a printer, a multi-function printer and so on.

The method 400 starts when a user selects and wants to submit a document for printing. At 402, a user interface is provided to the user to input one or more print attributes required for printing the document. In context of the current disclosure, the user interface includes a partial secure option for securing confidential content in the document. The partial secure option allows the user to secure a portion of the document that includes confidential content instead of securing the whole document. The user selects the secure partial option for securing confidential content in the document. At 404, the selection of the partial secure option is received. Based on the selection, the user interface further allows the user to select an area including the content he wishes to secure. Here, the user selects the confidential area including the confidential content. The selection of the confidential content is received. The user can directly select confidential content.

After this, one or more coordinates of the confidential area including the confidential content in the document are calculated, at 406, based on the selection of the confidential area in the document. At 408, the document, the print attributes, the selection of the partial secure option, the calculated coordinates are sent for further processing. For example, if the method 400 is implemented at the system 100, 200, the details such as the document, the print attributes, the selection of the partial secure option, the calculated coordinates are sent to a multi-function device such as 106 for further processing. But if the method 400 is implemented at a standalone device such as 110, 250, the document, the print attributes, the selection of the partial secure option, the calculated coordinates are directly processed at the device or sent to other modules for further processing.

This way, the multi-function device receives the details such as the document, the print attributes, the selection of the partial secure option, the calculated coordinates for further processing. At 410, based on the selection of the partial secure option, it is identified that the document is a confidential document or includes confidential content.

At 412, an IR mark is embedded in the document while printing. The IR mark can be included at any required/desired place in the document, for example, top left corner, bottom left corner, top right corner, or bottom right corner. At 414, the coordinate information of the confidential area including the confidential content in the document is embedded in the IR mark, while embedding the IR mark in the document Finally, at 416, the document is printed including the IR mark, for example, at the bottom right corner. Finally, the printed document is output with the IR mark including the coordinate information. The printed IR mark includes one or more coordinates of the confidential content/area for later retrieval and/or use. This way, the method 400 secures the confidential content at the time of printing.

Figure 5:
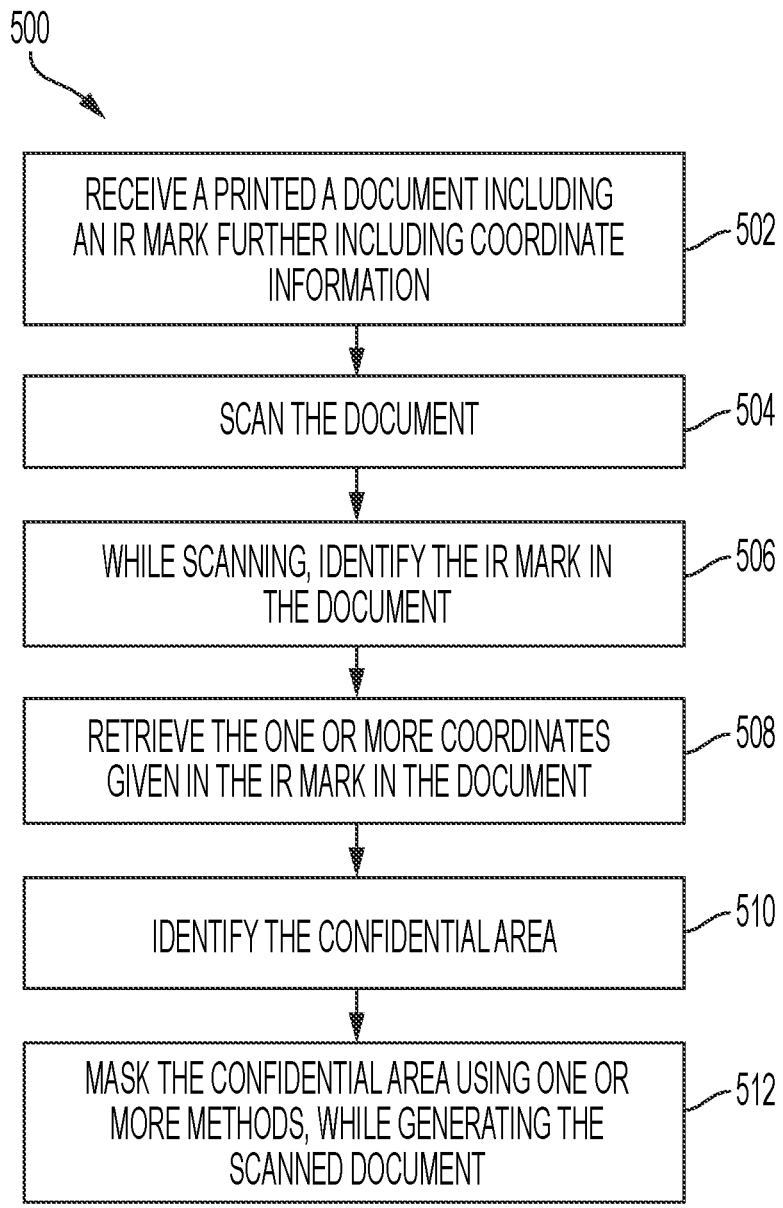
FIG. 5 is a method for securing content of a document, while generating one or more copies of the document.

FIG. 5 is a method 500 for securing confidential content of a user in a document while generating one or more copies of the document. Specifically, the method 500 secures confidential content in the document while scanning the document. The method 500 can be implemented at a device such as a scanner, a multi-function device such as the same multi-function device 106, 112 that prints the document or a different multi-function device 122, without limiting the scope of the disclosure.

The method 500 begins with receiving the printed document having an IR mark that further one or more coordinates of a confidential area including the confidential content in the printed document, at 502. The document with printed IR mark including the coordinates can be output according to the method 400 of the present disclosure.

Then, a user interface is provided to the user to confirm whether to scan the document or to copy the document. Based on the user confirmation, the method 500 proceeds forward, for example, with scanning operation. At 504, scanning of the printed document is initiated.

The method 500 includes scanning page by page and raw scanned images are generated for further processing. At 506, the scanned images are analyzed to identify/detect the presence of any IR mark in the document. Based on the detection of the IR mark in the document, it is identified that the document is a confidential document or includes a confidential content.

Then, the identified IR mark is extracted for further processing. The extracted IR mark is further processed using halftone techniques to identify the coordinate information included in the IR mark as discussed above in detail. For example, the halftone frequency estimation may include calculating halftone frequency using one or more pre-defined formulas as known. The calculated halftone frequencies are then compared with threshold values to classify the background region and the IR mark from the IR mark option. A region of the IR mark portion, whose halftone frequency is less than the threshold halftone frequency, is classified as a background region while, a region of the IR mark portion, whose halftone frequency is greater than the threshold halftone frequency, can be classified as an IR marked region including the one or more coordinates information.

At 508, the one or more coordinates given in the IR mark in the document are identified and further retrieved. At 510, based on the one or more coordinates, the confidential area including the confidential content in the document is identified. Post identifying the confidential area/content, at 512, the confidential area including the confidential content is masked. The confidential area can be masked using one or more methods as discussed above in detail. The confidential area/content is masked such that the content included in the confidential area is not visible to the user or read/seen by the user. This way, the method 500 secures content of the document when any user tries to create one or more copies from the printed document/original. The document submitted here refers to the printed version of the document.

Figure 6A:
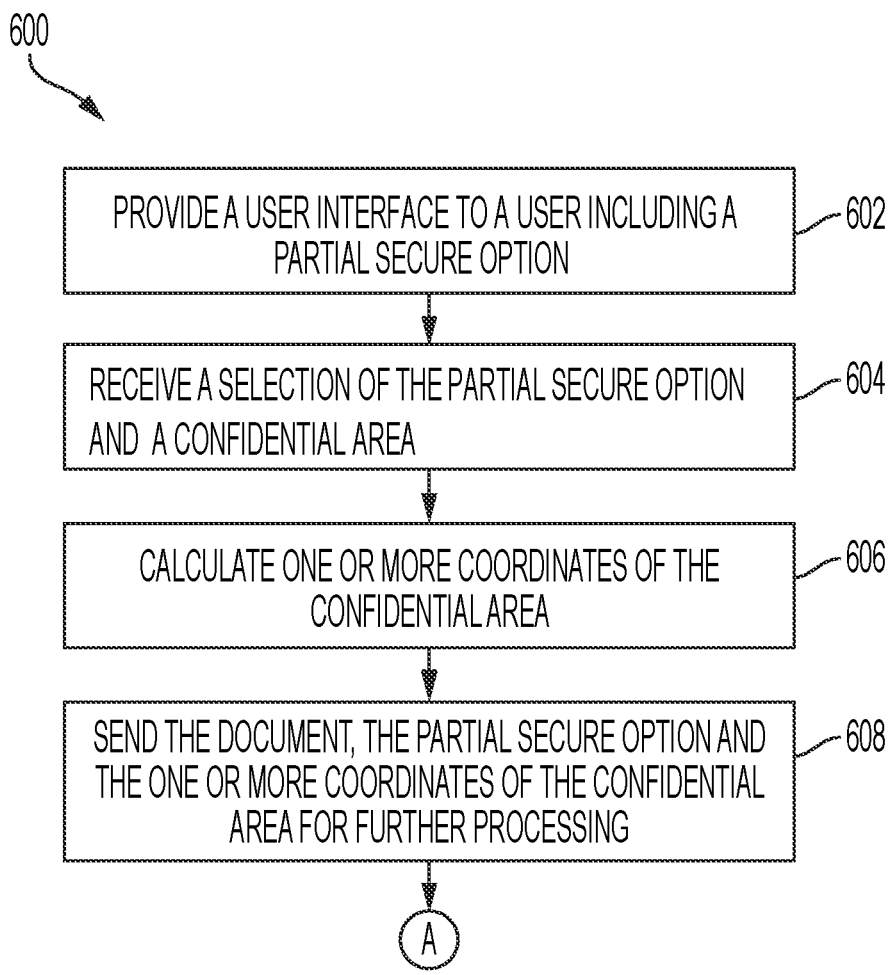
FIGS. 6A-6C represent a complete method for securing content of a document.
Figure 6B:
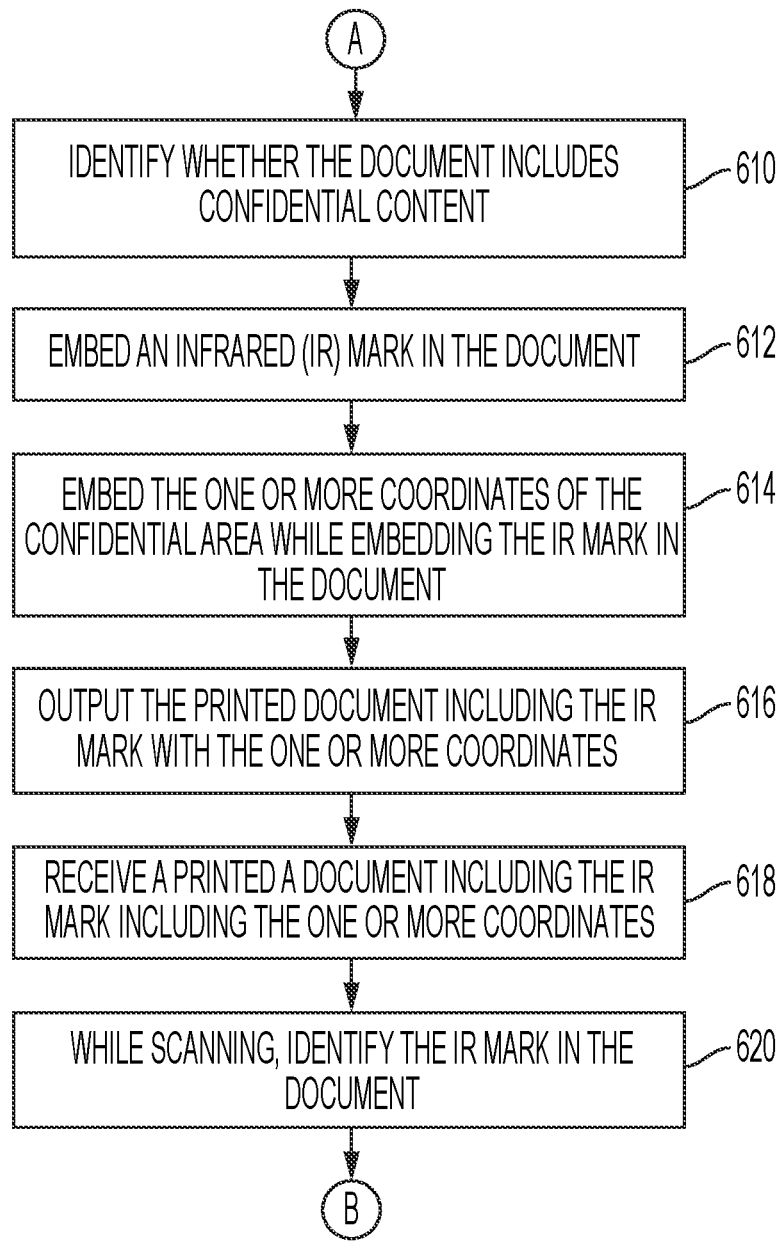
Figure 6C:
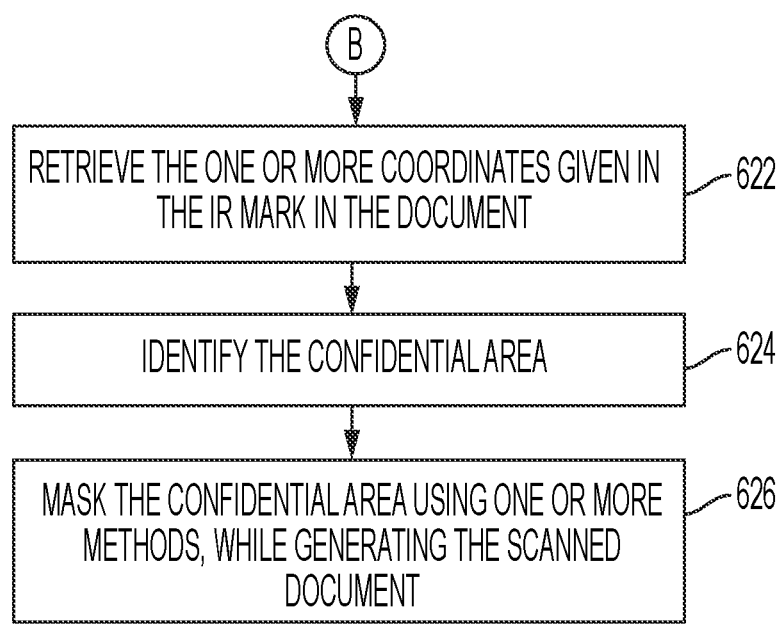

FIGS. 6A-6C represent a complete method 600 for securing confidential content of a document for a user. The method 600 can be implemented using a system including a computing device and a multi-function device. In another example, the method 600 can be implemented at a device such as a printer, a multi-function device, a multi-function printer and so on.

The method 600 starts when a user submits a document for printing. At 602, a user interface is provided to the user to input one or more print attributes required for printing the document. In context of the current disclosure, the user interface includes a partial secure option for securing confidential content in the document. The partial secure option allows the user to secure a portion of the document, instead of the whole document. For example, the user selects the secure partial option for securing confidential content in the document. At 604, the selection of the partial secure option is received. Based on the selection, the user interface further allows the user to select an area including the content he wishes to secure. Here, the user selects the confidential area including the confidential content.

After this, one or more coordinates of the confidential area including the confidential content in the document are calculated at 606, based on the selection of the confidential area in the document. At 608, the document, the print attributes, the selection of the partial secure option, the calculated coordinates are sent for further processing. For example, if the method 600 is implemented at the system 200, the details such as the document, the print attributes, the selection of the partial secure option, and the calculated coordinates are sent to a multi-function device 106 of system 200 for further processing. But if the method 600 is implemented at a standalone device such as 250, the document, the print attributes, the selection of the partial secure option, and the calculated coordinates are sent to other modules of the system 250 for further processing.

This way, the mufti-function device receives the details the document, the print attributes, the selection of the partial secure option, the calculated coordinates for further processing. At 610, based on the selection of the partial secure option it is identified that the document is a confidential document or includes confidential content. Then, printing of the document is initiated.

At 612, an IR mark is embedded in the document while printing the document. The IR mark can be included at any required/desired place in the document, for example, top left corner, bottom left corner, top right corner, or bottom right corner. At 614, the coordinate information of the confidential area including the confidential content is embedded in the IR mark, while embedding the IR mark in the document.

Finally, at 616, the document is printed including the IR mark, for example, at the bottom right corner. The printed IR mark includes one or more coordinates of the confidential content for later retrieval, access and/or use.

Later another user such as a bank agent uses the printed document to create one or more copies of the printed document. But the same user can use the printed document to create one or more copies of the printed document. For example, the user requires to handover the scanned copy of his document to another such as a bank agent. In such cases, the user wants to secure his confidential content before submitting the document to the bank agent.

At 618, the printed document is received, where the printed document includes an IR mark that further one or more coordinates of a confidential area including the confidential content.

A user interface is provided to the user to confirm whether to scan the document or to copy the document, Based on the user confirmation, the method 600 proceeds forward, for example, with scanning operation.

The method 600 includes scanning page by page and raw scanned images are generated for further processing. At 620, the scanned images are analyzed to detect/identify the presence of any IR mark in the document. Based on the detection of the IR mark in the document, it is identified that the document is a confidential document or includes a confidential content.

Then, the identified IR mark is extracted for further processing. The extracted IR mark is further processed using halftone techniques to identify the coordinates information included in the IR mark as discussed above in detail. At 622, the one or more coordinates information given in the IR mark in the document are identified and further retrieved. At 624, based on the one or more coordinates information, the confidential area including the confidential content in the document is identified. Post identifying the confidential area/content, at 626, the confidential area including the confidential content is masked. The confidential area can be masked using one or more methods as discussed above in detail. The confidential area/content is masked such that the content included in the confidential area is not visible or read/seen by any user. This way, the method 600 secures content of the document when any user tries to create one or more copies from the original/printed document.

Although the disclosure is discussed when other users such agent tries to create one or more copies of the user's document. But the disclosure can be implemented when the user himself creates one or more copies of his document. In such cases too, the copy of the document includes the masked confidential content and the copy with the masked confidential content can then be sent to another user such as agent.

As shown above, the coordinates included in the coordinate information are in exemplary order and there can be variations to the order of the coordinates and the type of coordinates.

The document in context of printing refers to a document (electronic or digital document) submitted for printing but the document in context of generating copies refers to a printed version of the document or the printed document submitted for scanning or copying operation.

The present disclosure discloses methods and systems for securing confidential content of a document while generating one or more copies of the document. For example, the methods and the systems secure the confidential content by masking the confidential content based on an IR mark in the document, while generating one or more copies of the document. This way, the methods and systems allow the user to share a copy of the document with other users without disclosing the confidential content. This provides an advance level of security for the confidential content in the document, while generating the copies of the document. The methods and the systems allow the user to secure any content of the document that the user deems as confidential. The user is not required to select/mark the confidential content each time, when copies of the document are generated to be shared with other users. Consequently, redundant work involved in securing the confidential content each time of generating copies of the document is eliminated, this in turn reduces processing time. The methods and systems provide an easy and a faster way to secure content while reproducing the document.

The methods and systems store coordinate information internally in IR mark, thereby providing an advanced level of security for user confidential content.

The methods and systems help classify confidential and non-confidential document. The methods and systems increase security protection by blanking confidential data while reproducing the document. The methods and systems additionally automate the existing method in print/copy/scan path for IR mark detection.

The methods and systems propose an enhancement to the Infrared (IR) mark security feature.

The methods and systems hide or blank out the confidential content in the final output scan or copy output.

For a person skilled in the art, it is understood that the use of phrase(s) "is", "are", "may", "can", "could", "will", "should" or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as or "receiving" or "providing" or "selecting" or "embedding" or "outputting" "or transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein as for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for allowing a user to secure confidential content of a document while printing the document, the method comprising:
    receiving a print request to print the document;
    providing a user interface to the user comprising a secure option, wherein the secure option further comprises a partial secure option to secure partial content of the document;
    based on the selection of the partial secure option, receiving a selection of a confidential area comprising the confidential content in the document;
    based on the selection of the confidential area in the document, calculating one or more coordinates of the confidential area comprising the confidential content in the document;
    sending at least the document and the one or more coordinates of the confidential area comprising the confidential content in the document for further processing;
    receiving at least the document and the one or more coordinates of the confidential area comprising the confidential content in the document, for printing;
    embedding an infrared (IR) mark in the document while printing;
    embedding the one or more coordinates of the confidential area comprising the confidential content in the IR mark, while embedding the IR mark in the document; and
    outputting a printed document comprising the IR mark comprising the one or more coordinates of the confidential area, upon completion of printing the document.

2. The method of claim 1, wherein the one or more coordinates of the confidential area comprise at least: x coordinate, y coordinate, height, and width.

3. The method of claim 1, further comprising, generating one or more copies from the printed document having the IR mark that further comprises the one or more coordinates of the confidential area.

4. The method of claim 3, further comprising, receiving the printed document comprising the IR mark that further comprises the one or more coordinates of the confidential area, for scanning.

5. The method of claim 3, further comprising, identifying the IR mark while scanning the printed document.

6. The method of claim 3, further comprising, identifying and retrieving the one or more coordinates of the confidential area from the printed document.

7. The method of claim 6, further comprising, identifying the confidential area in the printed document based on the retrieved one or more coordinates of the confidential area.

8. The method of claim 7, further comprising, masking the identified confidential area comprising the confidential content while generating the one or more copies of the printed document, thereby securing confidential content of the user.

9. A method for protecting confidential content of a user while generating one or more copies of a printed document, the method comprising:
    receiving the printed document comprising an infrared (IR) mark that further comprises one or more coordinates of a confidential area comprising confidential content in the printed document;
    scanning the printed document;
    while scanning the printed document, identifying the IR mark;
    identifying and retrieving the one or more coordinates of the confidential area as stored in the IR mark; and
    based on the one or more coordinates of the confidential area, masking the confidential content in the confidential area using, while generating the one or more copies of the printed document, thereby securing the confidential content of the user.

10. The method of claim 9, further comprising, identifying the confidential area comprising the confidential content.

11. The method of claim 9, further comprising, identifying whether the printed document is a confidential document based on the presence of the IR mark.

12. A method for protecting confidential content of a document while reproducing the document, the method comprising;
    receiving a print request from a user to print the document;
    providing a user interface to the user comprising a secure option, wherein the secure option further comprises a partial secure option to secure partial content of the document;
    based on the selection of the partial secure option, receiving a selection of a confidential area comprising the confidential content in the document;
    based on the selection of the confidential area in the document, calculating one or more coordinates of the confidential area comprising the confidential content in the document;
    embedding an infrared (IR) mark in the document while printing the document;
    embedding the one or more coordinates of the confidential area in the IR mark, while embedding the IR mark in the document;

outputting a printed document comprising the IR mark comprising the one or more coordinates of the confidential area for later use and/or access, upon completion of printing the document;

receiving a request for reproducing the printed document comprising the IR mark that further comprises the one or more coordinates of the confidential area;

based on the one or more coordinates of the confidential area in the IR mark, identifying the confidential area comprising the confidential content; and while reproducing one or more copies of the printed document, masking the confidential area comprising the confidential content while remaining content is output as-is.

13. The method of claim 12, wherein the one or more coordinates of the confidential area comprise at least: x coordinate, y coordinate, height or width.

14. The method of claim 12, further comprising, identifying the IR mark while generating one or more copies of the printed document.

15. The method of claim 12, further comprising, retrieving the IR mark and the one or more coordinates as stored in the IR mark.

16. A system for allowing a user to secure confidential content of a document while printing the document, the system comprising:

a print driver for:
receiving a print request from the user to print the document;
providing a user interface to the user comprising a secure option, wherein the secure option further comprises a partial secure option to secure partial content of the document;
based on the selection of the partial secure option, receiving a selection of a confidential area comprising the confidential content in the document;
based on the selection of the confidential area in the document, calculating one or more coordinates of the confidential area in the document; and
sending at least the document and the one or more coordinates of the confidential area comprising the confidential content in the document for further processing; and a multi-function device communicatively coupled to the print driver for:
receiving at least the document and the one or more coordinates of the confidential area comprising the confidential content in the document for printing;
embedding an infrared (IR) mark in the document while printing;
embedding the one or more coordinates of the confidential area comprising the confidential content in the IR mark, while embedding the IR mark in the document; and
outputting a printed document comprising the IR mark that comprises the one or more coordinates of the confidential area, upon completion of printing the document.

17. The system of claim 16, wherein at least one of: the multi-function device or another multi-function device receives the printed document having the IR mark that further comprises the one or more coordinates of the confidential area for generating one or more copies of the printed document.

18. The system of claim 16, wherein at least one of: the multi-function device or another multi-function device identifies the IR mark while generating the one or more copies.

19. The system of claim 16, wherein at least one of: the multi-function device or another multi-function device retrieves the IR mark and the one or more coordinates of the confidential area from the printed document using one or more methods.

20. The system of claim 16, wherein at least one of: the multi-function device or another multi-function device identifies the confidential area in the printed document based on the one or more coordinates.

21. The system of claim 20, wherein at least one of: the multi-function device or another multi-function device masks the identified confidential area comprising the confidential content while generating the one or more copies of the printed document.

22. A multi-function device for protecting confidential content of a user while generating one or more copies of a document, the multi-function device comprising:

a scanning platform for receiving a printed version of the document comprising an IR mark that further comprises one or more coordinates of a confidential area comprising the confidential content in the printed document;

a scanner for scanning the printed document; and a controller for:
while scanning the printed document, identifying the IR mark;
identifying and retrieving the one or more coordinates of the confidential area, stored in the IR mark;
based on the one or more coordinates of the confidential area, masking the confidential content in the confidential area, while generating the one or more copies of the printed document, thereby securing the confidential content of the user.

23. The multi-function device of claim 22, wherein the controller extracts the IR mark from the printed document, at the time of scanning.

24. The mufti-function device of claim 22, wherein the controller identifies the confidential area comprising the confidential content based on the one or more coordinates.

25. The mufti-function device of claim 22, wherein the controller identifies whether the printed document is a confidential document based on the presence of the IR mark.

26. A device for protecting confidential content of a document while reproducing the document, the device is for:
receiving the document for printing from a user;
before printing, providing a user interface to the user having a secure option, wherein the secure option further comprises a partial secure option to secure partial content of the document;
based on the selection of the partial secure option, receiving a selection a confidential area comprising the confidential content in the document;
based on the selection of the confidential area in the document, calculating one or more coordinates of the confidential area comprising the confidential content in the document;
embedding an infrared (IR) mark in the document while printing the document;
embedding the one or more coordinates of the confidential area in the IR mark, while embedding the IR mark in the document;
outputting a printed document comprising the IR mark comprising the one or more coordinates of the confidential area, upon completion of printing the document for later use and/or access;

receiving a request for reproducing the printed document comprising the IR mark that further comprises the one or more coordinates of the confidential area;

based on the one or more coordinates in the IR mark, identifying the confidential area comprising the confidential content; and while reproducing one or more copies of the printed document, masking the confidential area comprising the confidential content while remaining content is output as-is.

27. The device of claim 26, wherein the one or more coordinates of the confidential area comprise at least: x coordinate, y coordinate, height, or width.

28. The device of claim 26 identifies the IR mark while scanning the printed document.

29. The device of claim 26 retrieves the IR mark and the one or more coordinates of the confidential area as stored in the IR mark.

30. The device of claim 26 identifies the confidential area based on the one or more coordinates.

* * * * *